United States Patent [19]
Meyer, III

[11] Patent Number: 5,309,931
[45] Date of Patent: May 10, 1994

[54] AUTOMATIC TIRE TREATMENT SYSTEM
[75] Inventor: Frank X. Meyer, III, Forest, Va.
[73] Assignee: Armatics Incorporated, Lynchburg, Va.
[21] Appl. No.: 872,725
[22] Filed: Apr. 21, 1992
[51] Int. Cl.$^5$ ............................................... B60S 3/04
[52] U.S. Cl. .................................. 134/57 R; 134/123
[58] Field of Search ................ 15/53.4; 134/45, 57 R, 134/123

[56] References Cited

U.S. PATENT DOCUMENTS

| | | | |
|---|---|---|---|
| 2,692,214 | 10/1954 | Hurst | 134/123 X |
| 2,957,195 | 10/1960 | Almond | 134/123 X |
| 3,208,089 | 9/1965 | Vani | 15/53.4 |
| 3,446,217 | 5/1969 | Collier | 134/45 |
| 3,561,031 | 2/1971 | Gusse et al. | 15/53.4 |
| 3,604,433 | 9/1971 | Notthoff | 134/45 |
| 3,913,162 | 10/1975 | Parkin | 15/53.4 |
| 4,178,948 | 12/1979 | Swinehart | 15/53.4 X |
| 4,971,084 | 11/1990 | Smith et al. | 134/123 X |
| 4,985,957 | 1/1991 | Belanger et al. | 15/53.4 X |

Primary Examiner—Philip R. Coe
Attorney, Agent, or Firm—Malin, Haley DiMaggio & Crosby

[57] ABSTRACT

The instant invention provides a fully automated tire treatment system capable of applying chemical treatment uniformly to a tire sidewall. Employing a pair of tracks whereon a carriage and adjustable vending bracket is disposed thereon allows treatment of two tires simultaneously as the tires pass the device triggering a preprogrammed set of instructions though a microprocessor. The track is two elongated guides disposed in parallel relation to one another outboard of the stance posed by a conventional automobile. The carriage has a longitudinal axis perpendicular to the track and is movable along the length of the track. Each carriage employs a vending bracket having the ability to disburse moisture from the tire sidewall before dispensing of chemical by use of an atomizing spray nozzle. By use of a microprocessor, each tire is tracked in accordance with the velocity, dimensional size, and predetermined spatial proximity of an automobile tire as the automobile is moved along a prescribed path of travel. Once enabled, the carriage moves at the same velocity as the tire while the vending bracket is traversed into a position of close proximity to the tire. The vending bracket employs an air dryer for removing excess water from the tire and a vending spray nozzle having an atomized spray pattern. Upon treatment of the tire the vending bracket is retracted and the carriage returned to its original position.

5 Claims, 8 Drawing Sheets

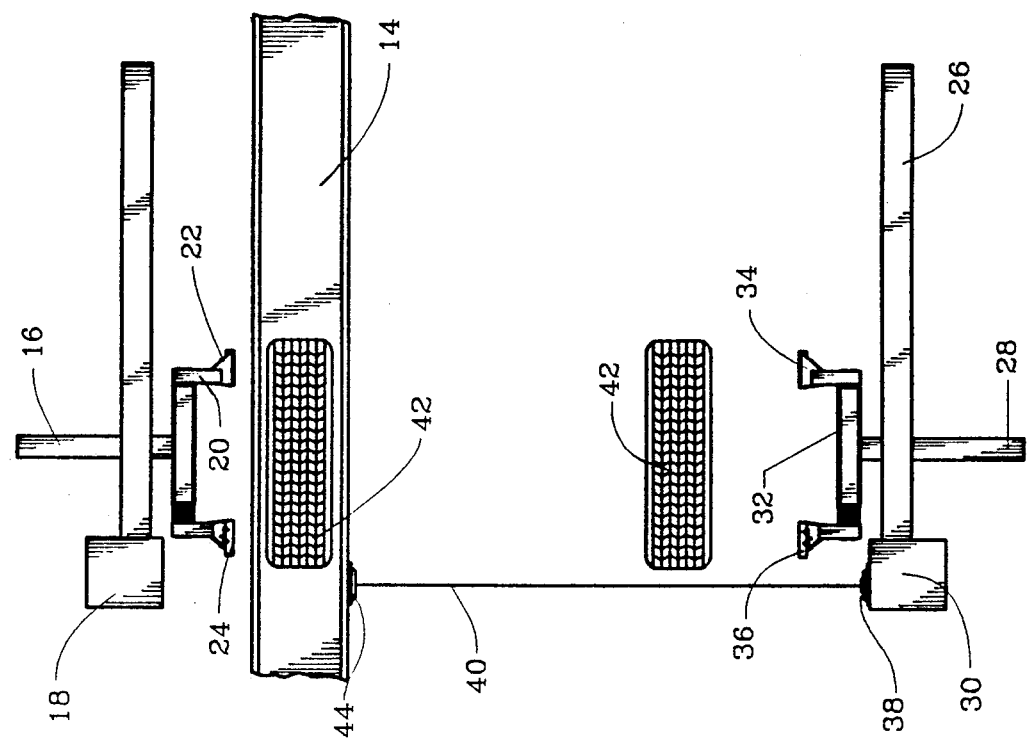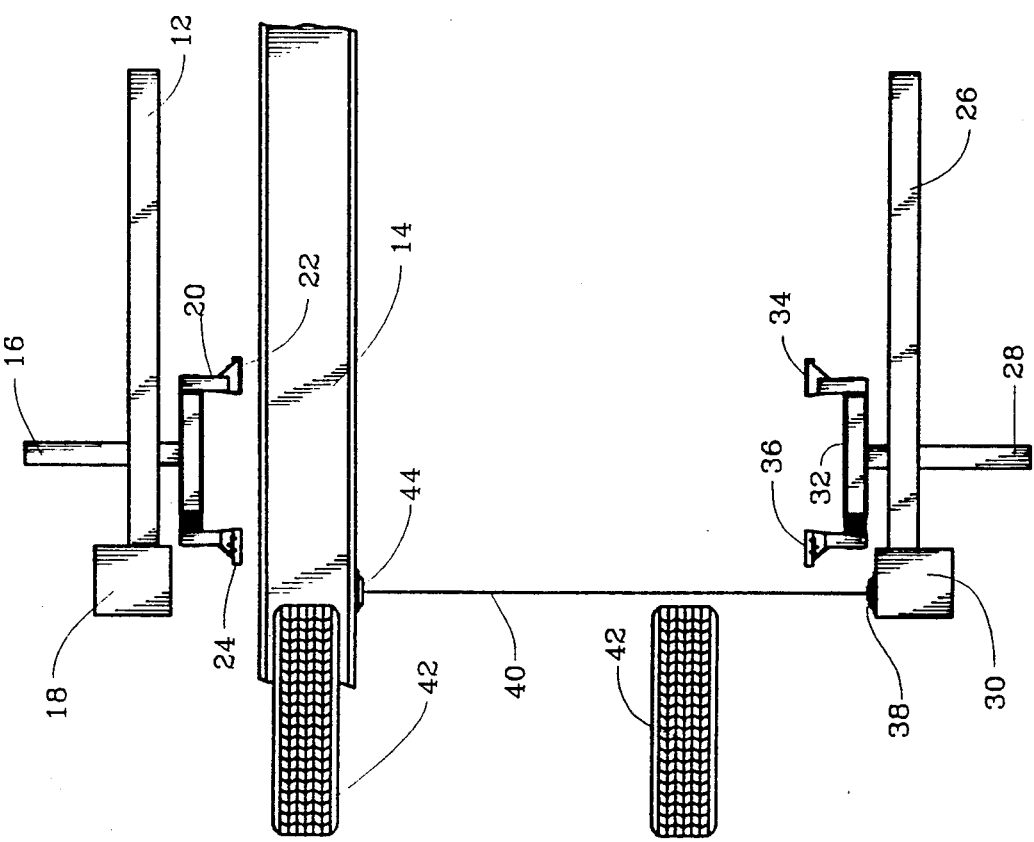

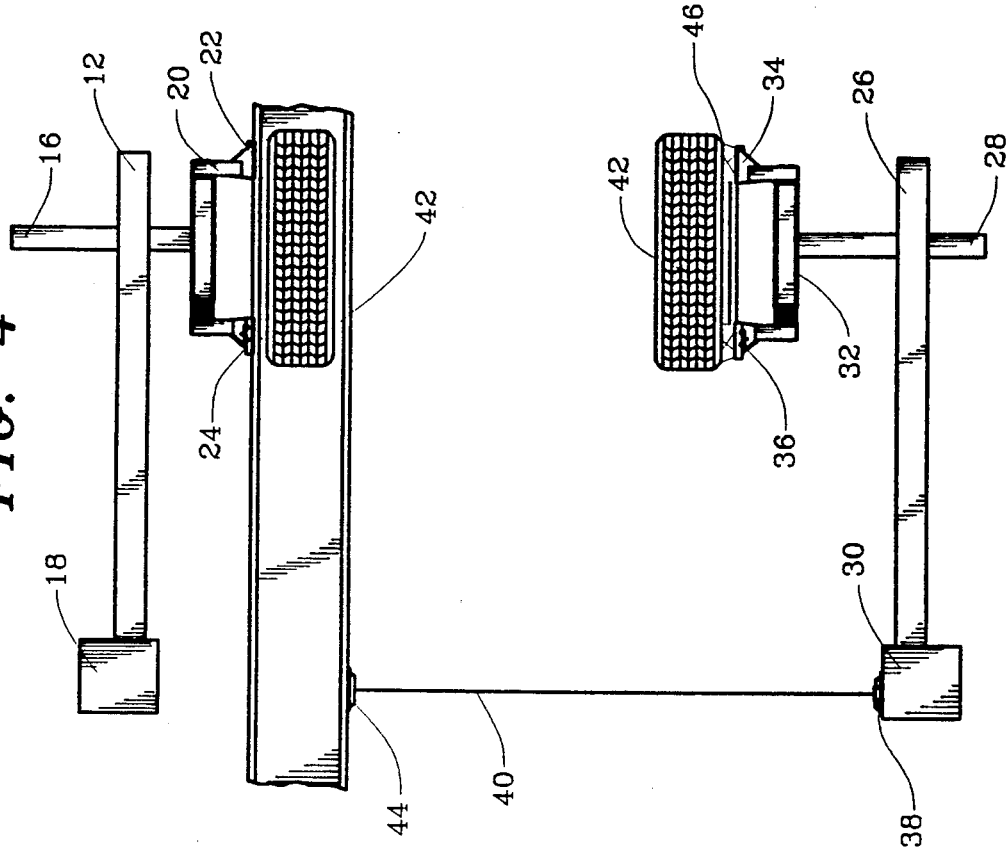
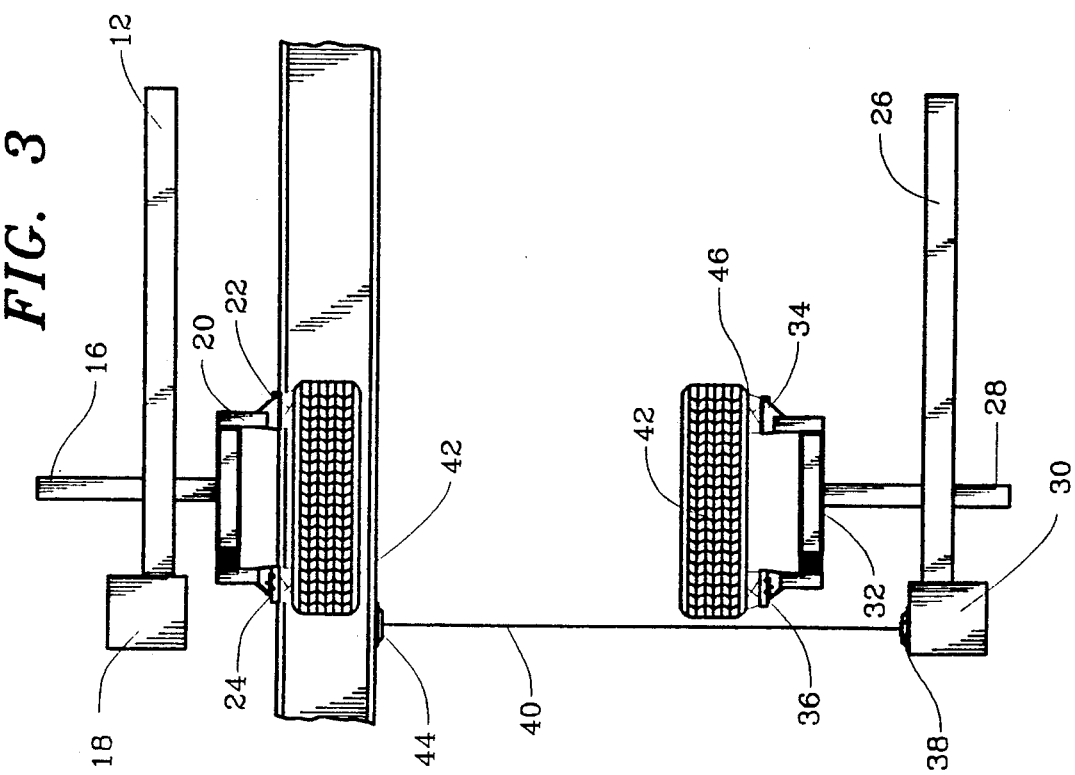

AUTOMATIC TIRE TREATMENT SYSTEM

BACKGROUND OF THE INVENTION

1. Field of the Invention

This invention relates to the maintenance of vehicle tires and, more particularly, to an automated device capable of applying tire treatment chemical to vehicle tires in combination with a conventional carwash by means of a unique computer controlled tire tracking system.

2. Description of the Prior Art

The automobile is the largest investment a person typically makes after the purchase of a home. Constantly exposed to the elements, the appearance of this investment is maintained by periodic, if not weekly, cleaning. Cleaning preserves exposed surfaces by removal of dirt, grime, or oxidants before they have an opportunity to attack a surface or otherwise detract from the automobile's appearance. To this end, numerous cleaning agents, polishes, and waxes are available.

The automobile tire, to which the instant invention is directed, is an integral part of the automobile investment yet the most neglected. Viewed as a replacement item the tire is typically cleaned, if at all, only for appearance purposes. Well known to automobile enthusiasts are protective chemicals that can be used to enhance the tire appearance as well as condition the tire to withstand the most severe conditions. For instance, the use of silicon based chemicals are known for their ability to prevent sidewall cracking by shielding against the effects of ozone and ultra-violet sun rays.

The problem with the use of chemical treatments is their method of application. Most every type of chemical treatment requires the tire to be clean to provide adhesion and dry to prevent dilution. For this reason application of a protective chemical must be done immediately after cleaning for optimum adherence. Another problem with chemical application is that frequent treatment is required for exemplary results.

The primary method of applying tire treatment chemical is by manually spraying the chemical onto the tire from a portable pump spray bottle. The spraying is often inaccurate causing wasteful application of the chemical during application. Since the application requires manual treatment, the consumer must treat their own tires unless they are willing to pay "full-service" car washers or automobile detailers. Even full-service carwashes attempt to lessen their manpower demands automating the washing, waxing, and drying cycles. For this reason numerous attempts have been made to incorporate automatic wheel washing devices into the automatic carwash, however, no such wheel washing device provides a means for post treatment of the tire with chemical.

U.S. Pat. No. 3,913,165, issued to Parkin exemplifies the automatic wheel washing prior art by disclosing a cleaning cycle for a wheel washer that moves along a prescribed path of travel in parallel relation to the velocity of the vehicle travel. The apparatus employs a circular brush which revolves about its own axis and is forced against the tire of the vehicle following the tire until the tire has made one complete revolution. The brushes compensate to various width vehicles by moving the brush brackets inward.

Numerous other automatic wheel washing devices exist including U.S. Pat. Nos. 1,909,869 issued to Randrup; U.S. Pat. No. 2,718,650 issued to Haverberg; U.S. Pat. No. 2,814,825 issued to Guthrie; U.S. Pat. No. 2,857,605 issued to Weishaar; U.S. Pat. No. 2,881,459 issued to Emanuel; U.S. Pat. No. 2,904,894 issued to Hurst; U.S. Pat. No. 2,975,446 issued to Furman; U.S. Pat. No. 3,058,133 issued to Haverberg; U.S. Pat. No. 3,191,207 issued to Brakel; U.S. Pat. No. 3,305,886 issued to Fricke; U.S. Pat. No. 3,913,165 issued to Parkin; and U.S. Pat. No. 4,178,948 issued to Swinehart.

Known prior art for applying tire treatment chemical within an automatic carwash setting is limited to stationary spraying devices. These devices rely upon an instant vending of a large amount of chemical in an attempt to treat the tire as the tire passes the spraying device. Instant vending employs numerous spray nozzles placed a predetermined distance from the tire sidewall. However, all vehicles do not use the same size tire and the result is either over-spray or under-spray of the chemical causing excessive waste if not failure of the attempted treatment. Waste of chemical is of particular concern due to its expense. Further, the majority of tire treatment chemicals are silicon based which can aggregate on the floor leading to dangerously slippery conditions.

In addition, over-spray of treatment chemical causes chrome and painted surfaces to take on a hazy appearance which is difficult to remove. Since wheel and tire size vary from car to car, multiple jets placed in a circular manner cannot limit their spray to the tire portion and frequently spray the body of the automobile, the wheel hubs or exposed functional steering or brake parts.

Streaking is yet another problem with the prior art. If excess moisture is not removed from the tire, application of the chemical will congregate or dilute with streaking as a result. If a circular shield is used to prevent overspray, a concentration of chemical may result also leading to streaking.

Accordingly, the present invention provides a tire treating system that tracks the movement of the vehicle tire as the vehicle is transported through a segment of a carwash assembly line, that is capable of automatically positioning a plurality of spray nozzles in close proximity to the tire sidewall, and is capable of stripping the moisture from the side wall while further providing an even dispersement of chemical in a uniform manner across the sidewall.

SUMMARY OF THE INVENTION

A machine for tracking and applying accurately a chemical cleaner and preservative to each tire sidewall of a vehicle while the vehicle moves along an automated carwash assembly line comprising at least one tire treatment chemical reservoir, a movable dryer and spray head housing mounted on a track that parallels the assembly line path space slightly away from one side of an automobile, a sensing system for locating and tracking each tire on one side of the moving vehicle, and an activating system for turning on and off the spray blower system.

The movable housing includes a bifurcated spray head arrangement that includes one blower and one chemical spray nozzle per head with a dual head relatively movable arrangement so that two dual heads can be linearly moved relative to each other on one housing to adjust to the proper size of the tire. This allows the tire to be dried and sprayed by each head for approximately 180° segment of its movement, depending upon the circumference.

The sensing system provides for actuating the entire system as the tire passes a given point, measures the size of the tire to provide the proper spread distance between each of the heads mounted on the housing, and includes a triggering means for spray head actuation wherein each spray head approaches the tire from a lateral side direction so that each spray head is the proper distance away from the tire surface when the spray action begins.

The spray heads are coupled to a vending bracket whose movement is made adjustable to the size of the tire and juxtapositioned to said tire by pneumatic, hydraulic, and or electric means. In addition, a means for drying of the tire is provided operatively associated with the vending bracket for positioning in connection with the spray heads.

Each applicator functions independently on each side of the vehicle except for the overall actuating system which allows them to be connected together for sensing when the system should be activated and when it should be shut down. The applicators share common information as to the width or proper diameter of the tire for adjusting the dual spray head nozzles to the proper position.

The primary objective of the instant invention is to provide a fully automated tire treatment system capable of applying protective chemicals uniformly to a tire sidewall with an emphasis on treating the tire sidewall exclusively. The instant invention provides a unique tracking system that accurately moves the spray nozzle so as to adjust to the width of the vehicle, the size of the tire, and the velocity of the tire (vehicle) for pinpoint chemical application. Operatively associated with each track, on each side of the spray head, is a carriage having a longitudinal axis perpendicular to the track and slidably disposed along the length of the track. On each carriage is placed a vending bracket having a dryer for dispersing moisture from the tire sidewall before dispensing of chemical. By use of a microprocessor, each tire is tracked by the spray nozzle in accordance with the proper spray distance to sidewall surface, dimensional size, and tire rotational velocity as the automobile is moved along a prescribed path of travel. Once enabled, the carriage moves at the same velocity as the tire while the dryer and spray head bracket is traversed into a position of close proximity to the tire. The vending bracket employs an air dryer for removing excess water from the tire and a vending spray nozzle having an atomized, predetermined spray pattern that is uniformly juxtapositioned to the tire sidewall for application of the chemical treatment at the appropriate time. Upon treatment of the tire the front vending heads are returned to their original position, the vending bracket is retracted from its position along the sidewall, and the carriage returned to its original position to await the arrival of the next tire.

Accordingly, an object of the instant invention is to provide a machine for tracking a moving tire and adjusting thereto in accordance with the drying and spray distance to the tire surface, dimensional tire size, and tire velocity as the automobile is moved along a prescribed path of travel for accurate application of a chemical treatment to the tire surface.

Another object of the instant invention is to provide a machine for removing excess moisture from the tire before chemical application.

Still another object of the instant invention is to provide a machine for treating the tire surface by use of at least one atomization spray nozzle during tire rotation having a predetermined spray pattern, accurate strike to a specific sidewall area, and to prevent over spray on the wheel or beyond the outer or inner circumference of the tire.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 1 is a top plan schematic view of the instant invention prior to sensor engagement with a pair of automobile tires representing both sides of a vehicle.

FIG. 2 is a top plan schematic view of the instant invention after sensor engagement with a passenger side automobile tire.

FIG. 3 is a top plan schematic view of the instant invention upon engagement and placement of the dryer and spray head housing next to each automobile tire sidewall.

FIG. 4 is a top plan schematic view of the instant invention upon engagement and placement of the dryer and spray head after tracking each automobile tire along the length of the guide.

DETAILED DESCRIPTION OF THE PREFERRED EMBODIMENT

Figure 5:
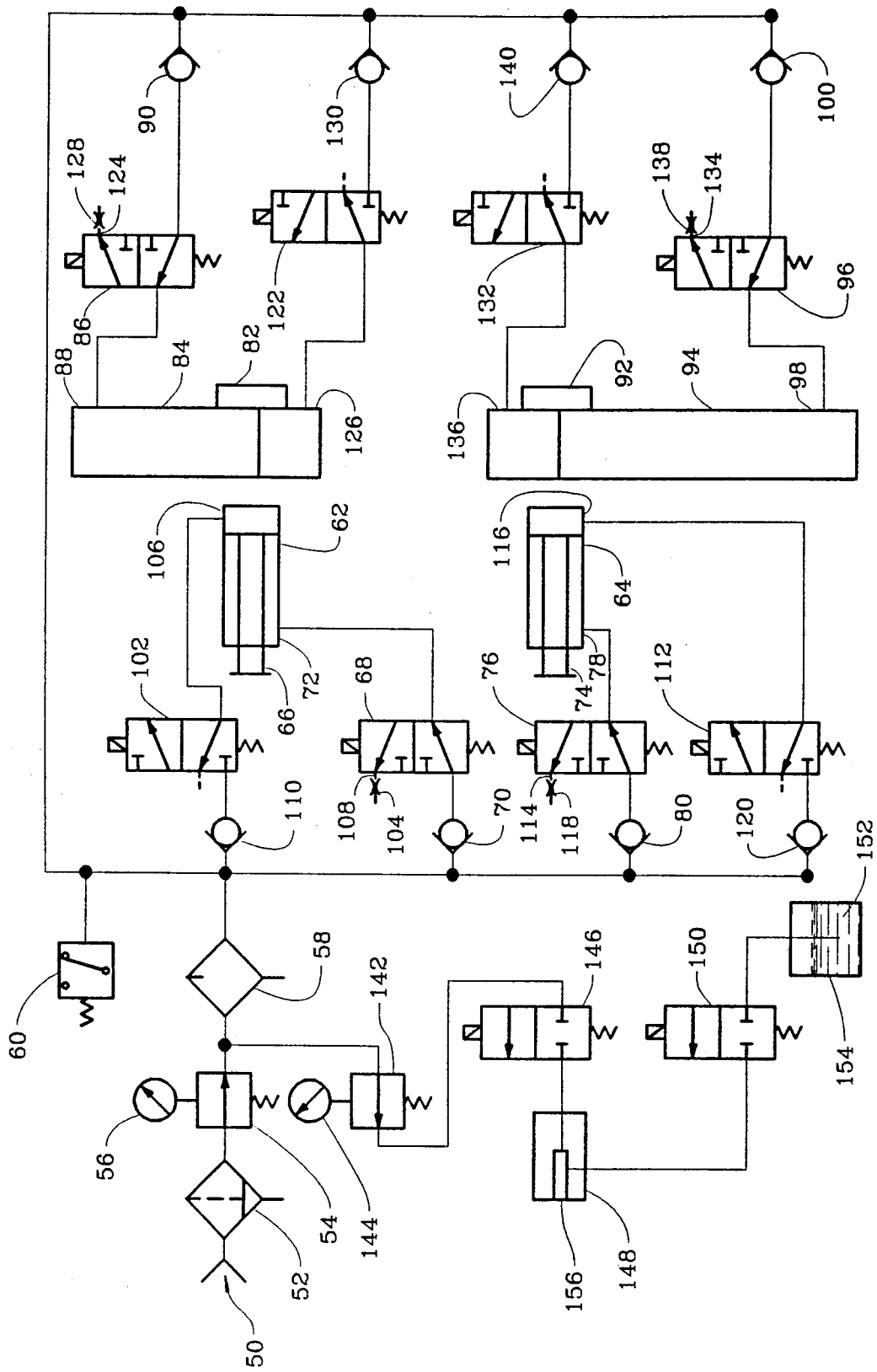
FIG. 5 is a schematic diagram of the pneumatic system.

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring to FIGS. 1 through 4, an automatic tire treatment machine is schematically shown to exemplify operation of the invention by tires 42 moving along a carwash assembly line. FIG. 1 depicts a first elongated guide track 12 disposed outboard a predefined vehicle tire path 14, which is typically a mechanical guide rail in a carwash assembly line. Carriage 16 is operatively associated with the track 12 and made operational along the length of the track 12 by use of carriage motor 18 positioned at one end of the track 12. The carriage 16 has a longitudinal axis perpendicular to the track 12 slidably disposed and operatively associated in the track 12. A vending bracket 20 rigidly attaches a front vending means 22 and adjustably attaches a rear vending means 24 to the carriage 16.

A second elongated guide track 26 is shown disposed outboard an undefined vehicle tire path with carriage 28 made operational along the length of the track 26 with the carriage motor 30 positioned at one end of the track 26. The carriage 28 having a longitudinal axis perpendicular to the track 26 slidably disposed and operatively associated in the track 26. A vending bracket 32 rigidly attaches a front vending means 34 and adjustably attaching a rear vending means 36 to the carriage 32.

A photoelectric receiver 38 is disposed forward proximate to the vending bracket 32 for receiving a photoelectric beam 40 transverse to the tire's 42 path 14 of travel. Conversely, a photoelectric emitter 44 is employed for producing the photoelectric beam 40, the photoelectric emitter 44 disposed opposite the photoelectric receiver 38 along the inner wall of tire guide track 14. It should be noted that all vehicles do not track uniformly through the carwash whether due to weight, tire design, or transmission friction. For this reason a plurality of photoelectric beams can be employed traverse to the tire path for determination of, or verification of, proper tire size despite erratic vehicle movement as described in detail later in this specification. Use of a single beam may lead to incorrect tire sizing, however, for purposes of drawing simplicity only a single beam is depicted.

Now referring to FIG. 2, operation of the photoelectrics is used in conjunction with a microprocessor, not shown, which in turn is connected to the photoelectric receiver 38 including a means for translating and a means for reciprocating, whereby the microprocessor activates the means for translating when a tire 42 breaks the photoelectric beam 40. The means for translating and synchronizing the carriage forward speed is accomplished by monitoring conveyor speed for encoding purposes. The means for translating includes the use of the microprocessor for computing inches per impulse of conveyor travel according to encoder impulse for determination of inches of travel by means of the microprocessor clocking function. In particular, when an approaching car is to be treated, the carwash controller will signal operation of the apparatus whereby the microprocessor calculates the duration between the breaking of the beam 40 by the forward edge of a passing tire 42 and the time the beam 40 is returned by passing of the tailing edge of the tire 42. The computation is from the distance across the tire 42 at the photo 21 beam 40 height, preferably 2 to 8 inches from the floor, as well as the center of the tire 42 the instant the beam 40 is unbroken. The wheel tangent distance across the wheel at 10 inches from the floor is calculated by a formula derived from a predetermined tire/wheel data chart providing a correlation between the tire tangent point at 5 inches off the floor and the wheel tangent point at 10 inches off the floor thus providing the location of the center of the tire and the time at which the tire will align with the center of the adjusted vending bracket. The microprocessor activates the means for reciprocating so that the rear vending means 24 and 36 and front vending means 22 and 34 are indexed into a second position when the tire 42 moves out of the photoelectric beam 40 path. For example, the factory set distance between front vending means 22 and rear vending means 24 is twelve inches. If the microprocessor determines a required differential of fifteen inches for proper vending means placement, carriage 16 is advanced the three inches and stopped.

The rear vending means 24 is then extended by use of a pneumatic actuator, described in detail later in this specification, which increases the distance between the front and rear vending means. The rear vending means is extended to its original or home location determinable by means of a proximity switch or the like disposed adjacent to the home location. Similarly, rear vending means 36 is extended to its home location whereby the required differential of fifteen inches between the front and rear vending means is accomplished.

Referring to FIG. 3 the carriages 16 and 28 are advanced in direct relation to the speed and location of the tire as previously determined by the microprocessor encoder impulse to the carriage translating means. Next the vending brackets are advanced to each tire sidewall by use of a pneumatic band cylinder operatively associated with each carriage. The inward progressing vending brackets are controlled by a means for positioning the vending bracket in a predetermined position to each said tire sidewall. The means for positioning the vending bracket may be accomplished by convergent beam photoelectric sensors 46, contact switches, ultrasonic wave production, and so forth, the mechanics of which is not deemed limiting to this invention. Upon positioning, the vending cycle occurs by use of air dryer blowers to strip excess moisture from each tire side wall while the nozzles disperse chemical in a substantially horizontal spray pattern.

In FIG. 4 the carriages 16 and 28 have tracked the tires movement in accordance with the microprocessor instructions set forth by impulse to the stepper motors. The vending cycle taking place throughout the carriage advancement. When the carriages reach the end of their travel, as defined by a calculated amount of impulses transmitted by the microprocessor to the stepper motors, the vending cycle is stopped. The microprocessor subsequently deactivates the means for traversing such that the carriages are retracted to their original position, and the vending heads shifted to their home positions.

Referring to FIG. 5 the pneumatic functions are set forth for greater illustration.

Air supply: An uninterrupted supply of air 50 is delivered through moisture filter 52 and regulated at a predetermined level, preferably 85 psi, by regulator 54 monitored by gauge 56. Lubricator 58 provides internal oil lubrication into the pneumatic system to assist in the mechanical operation of the valves and cylinders. Pressure switch 60 enables the microprocessor system upon available pressure, inadequate pressure disabling the system and triggers an alarm if air pressure falls beneath a predetermined level.

Automatic Retraction: Cylinder 62 and 64 provide vending bracket spacial distance for adjustability to various sized tires. Cylinder rods 66 of vending bracket cylinder 62 are retracted by passage of air through normally open solenoid valve 68 which pressurizes retraction end 72 of cylinder 62. Cylinder rods 74 of vending bracket cylinder 64 are retracted by passage of air through normally open solenoid valve 76 which pressurizes retraction end 78 of cylinder 64.

Left cylinder carriage 82 having cylinder 84 is shown retracted, placed in the retracted position by passage of air through normally open solenoid valve 86 which pressurizes retraction end 88. Right cylinder carriage 92 having cylinder 94 is also shown retracted, placed in the retracted position by passage of air through normally open solenoid valve 96 which pressurizes retraction end 98.

Vending Head Shift Out: Cylinder rods 66 of vending bracket cylinder 62 are made operational by energizing solenoid valves 68 and 102. Normally closed valve 102 is coupled to pressurizing end 106 of vending bracket cylinder 62 and air passing therethrough causes cylinder rods 66 to extend. Normally open valve 68 directs the air from retraction end through exhaust port 104 at a predetermined rate by flow restrictor 108. Reverse flow is prevented by check valves 70 and 110 effectively locking cylinder 66 in a position determined by a vending bracket positioning means. Similarly, cylinder rods 74 of vending bracket cylinder 64 are made operational by energizing solenoid valves 76 and 112. Normally closed valve 112 is coupled to pressurizing end 116 of vending bracket cylinder 64 and placement of air therethrough causes cylinder rods 74 to extend. Normally open valve 76 directs the air from retraction end 78 through exhaust port 114 at a predetermined rate by flow restrictor 118. Reverse flow is prevented by check valves 80 and 120 effectively locking the cylinder 74 in a position determined by a vending bracket positioning means.

Vending Bracket Extension: Vending bracket cylinder 84 is made operational by energizing solenoid valves 86 and 122. Normally closed valve 122 is coupled to pressurizing end 126 of vending bracket cylinder 84 causing vending bracket 20 to move toward the sidewall of the tire. Normally open valve 86 directs the air from retraction end 88 through exhaust port 124 at a predetermined rate by flow restrictor 128. Reverse flow is prevented by check valves 90 and 130 effectively locking the cylinder 84 in a position determined by a vending bracket positioning means.

Similarly, vending bracket 94 is made operational by energizing solenoid valves 96 and 132. Normally closed valve 132 is coupled to pressurizing end 136 of vending bracket cylinder 94 causing vending bracket 32 to move toward the sidewall of the tire. Normally open valve 96 directs the air from retraction end 98 to be released through exhaust port 134 at a predetermined rate by flow restrictor 138. Reverse flow is prevented by check valves 100 and 140 effectively locking the cylinder 94 in a position determined by a vending bracket positioning means.

Spray Cycle: After both vending brackets have been adjusted to the size of the wheel and juxtapositioned to the sidewall of the tire, a spray cycle is made operational. Supply air is made adjustable by regulator 142, pressure of which is monitored by gauge 144. Solenoid 146 is energized allowing air to pass through the solenoid for delivery to spray nozzle 148. In addition, solenoid 150 is energized wherein the air flow through spray nozzle 148 creates a venturi which draws the tire treatment chemical 152 from reservoir 154 into spray nozzle 148, the air flow atomizes the chemical for nozzle dispersion 156. It should be noted that multiple spray cycle nozzles exist as later described, a single nozzle depicted for clarity purposes only.

Cylinder Retraction: Upon completion of the spray vending cycle solenoids 68, 76, 102, and 112, are deenergized allowing cylinder rods 66 and 74 to return to their normally retracted position, similarly solenoids 86, 96, 122, and 132 are deenergized allowing cylinders 84 and 94 to return to their retracted position.

Figure 6:
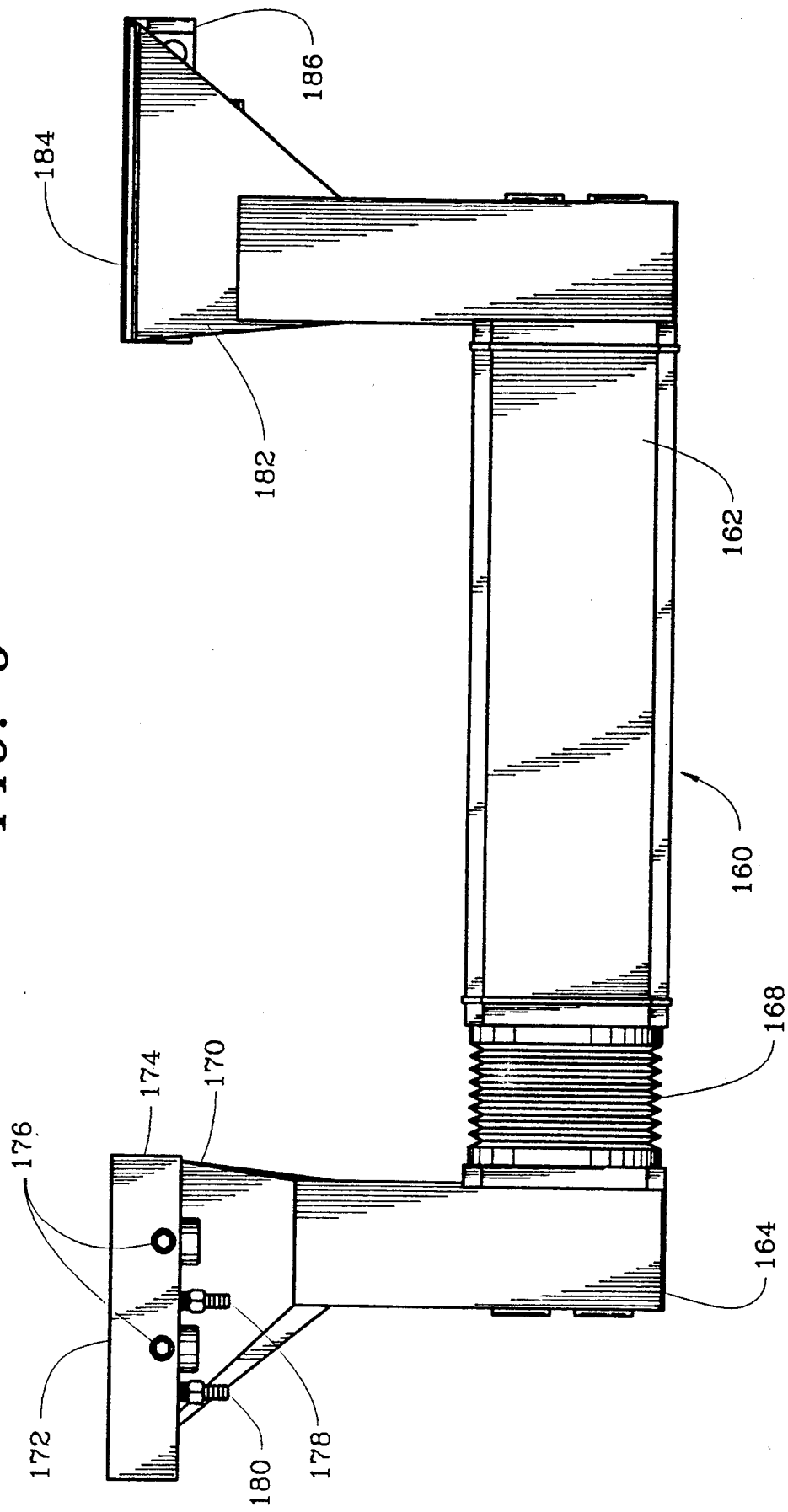
FIG. 6 is a top view of an application housing.

Referring now to FIG. 6, one vending nozzle assembly 160 is shown, the second vending nozzle a mirror image. The vending bracket assembly 160 employs a conventional pneumatic single piston multiple rod cylinder housing 162. The cylinder housing 162 remaining stationary in relation to the carriage. Movable vending bracket 164 is attached to the piston by at least two piston rods, not shown, for maintaining vending bracket 164 in a repeatable horizontal plane to stationary housing 162, multiple piston rods preventing the movable vending bracket 164 from twisting out of position. Flexible covering 168 prevents dirt, moisture or the like damage from affecting piston rods.

The rear vending means comprises an air blower nozzle 170 having a elongated slot 172 placed substantially horizontal providing an downward flow pattern for inducing a wind shear effect. When the air blower nozzle 170 is juxtapositioned to the rear portion of the tire, the tire rotation is upward and the wind shear effect is downward directed at the tire surface for stripping moisture from the tire surface. Air produced is by means of a conventional air blower, not shown. A spray nozzle device 174 is coupled 176 to the nozzle 170 with the pressurized air input 178 and fluid treatment chemical input 180 providing an atomized spray pattern directly after the air shear produced by the air blower for depositing the chemical on the moisture sheared tire portion.

The front vending means comprises an air blower nozzle 182 permanently attached to the cylinder housing 160 having an elongated slot 184 placed substantially horizontal providing upward flow pattern for inducing a wind shear effect. When the air blower nozzle 182 is juxtapositioned to the forward portion of the tire, the tire rotation is downward and the wind shear effect is upward directed at the tire surface for stripping moisture from the tire surface. Air produced is by means of a conventional air blower, not shown. A spray nozzle device 186 is coupled to the bracket 182 with the pressurized air input and fluid treatment chemical input providing an atomized spray pattern directly after the air shear produced by the air blower for depositing the chemical on the moisture sheared tire portion in a similar manner as spray nozzle 174.

Figure 7:
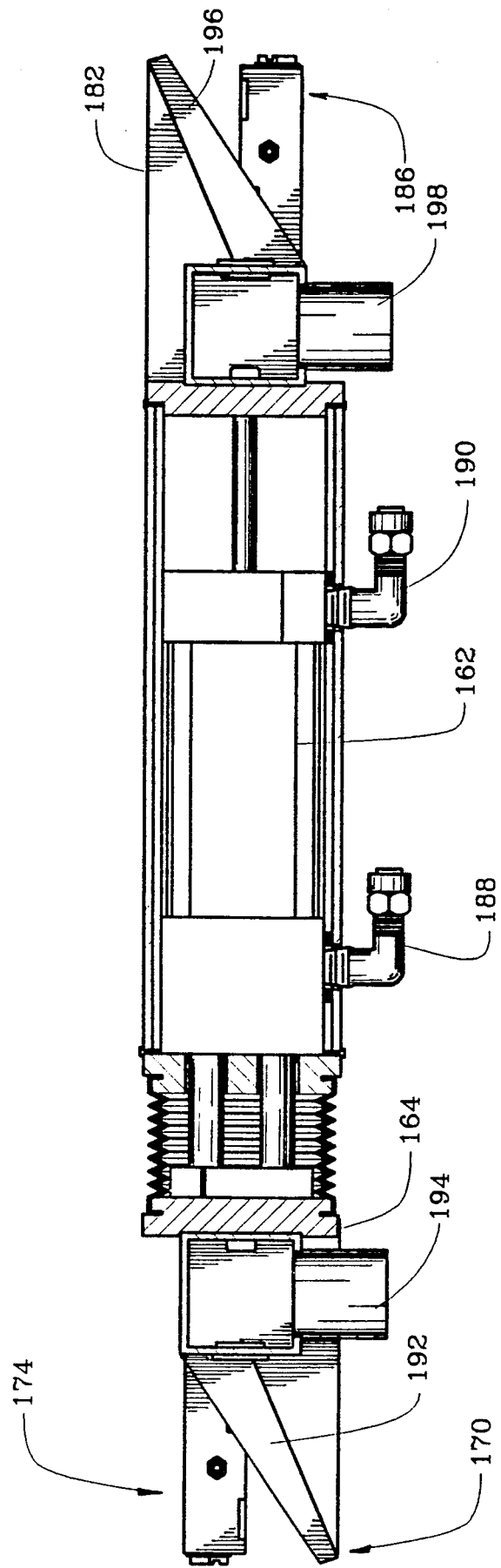
FIG. 7 is a rear elevational view of the application housing of FIG. 6.

FIG. 7 is a side view of the vending bracket illustrated in FIG. 6. Shown is the air supply inlet 188 for retracting the movable vending bracket 164 and the air supply inlet 190 for extending the movable vending bracket 164 by pressurization of the cylinder 162. The air blower nozzle 170 of the rear vending means is shown with an angular bend 192 for channelling of the air. Air blower inlet coupling 194 and sprayer nozzle 174 are readily viewable from this angle. Similarly the air blower nozzle 182 of the front vending means is shown with an angular bend 196 for channelling of the air. Air blower inlet coupling 198 and sprayer nozzle 186 are readily viewable from this angle.

Figure 8:
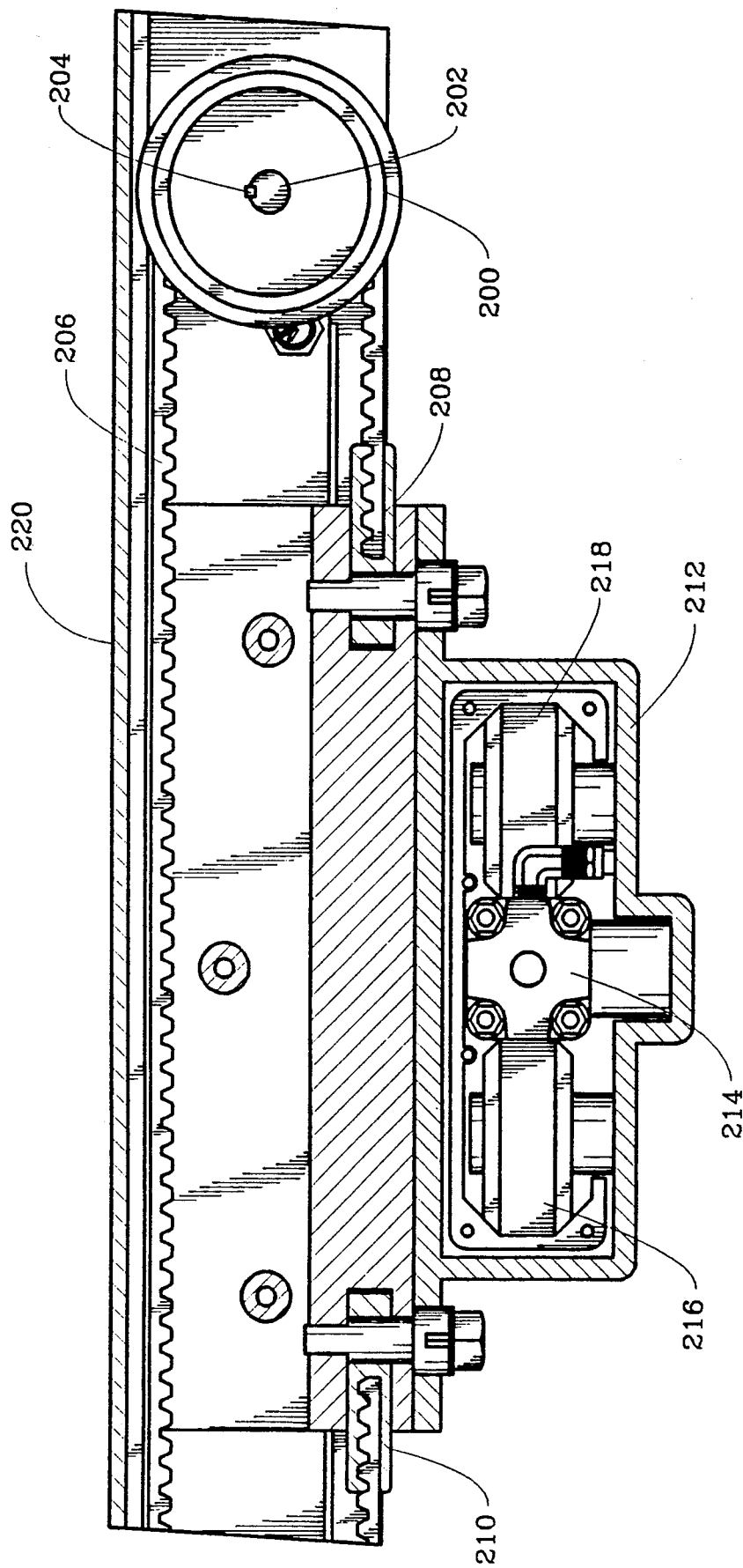
FIG. 8 is a cross sectional side view of the guide track and end view of the extension arm.

FIG. 8 depicts a cross sectional side view of the carriage wherein a pulley 200 having 25 equally spaced 8 mm grooves cut to a poly belt is coupled directly to a conventional DC motor shaft 202 and held in position by a key 204. A belt 206 is held in position by belt clamp 208, pulled around the pulley 200 to an idler arm pulley not shown to a second belt clamp 210. Clamps 208 and 210 attached to a support bracket housing 212 vending arm extension assembly defined by a pneumatic cylinder 214 held in position by rollers 216 and 218. The support bracket 212 movable along a longitudinal axis of guide track 220 in response to carriage motor positioning.

Figure 9:
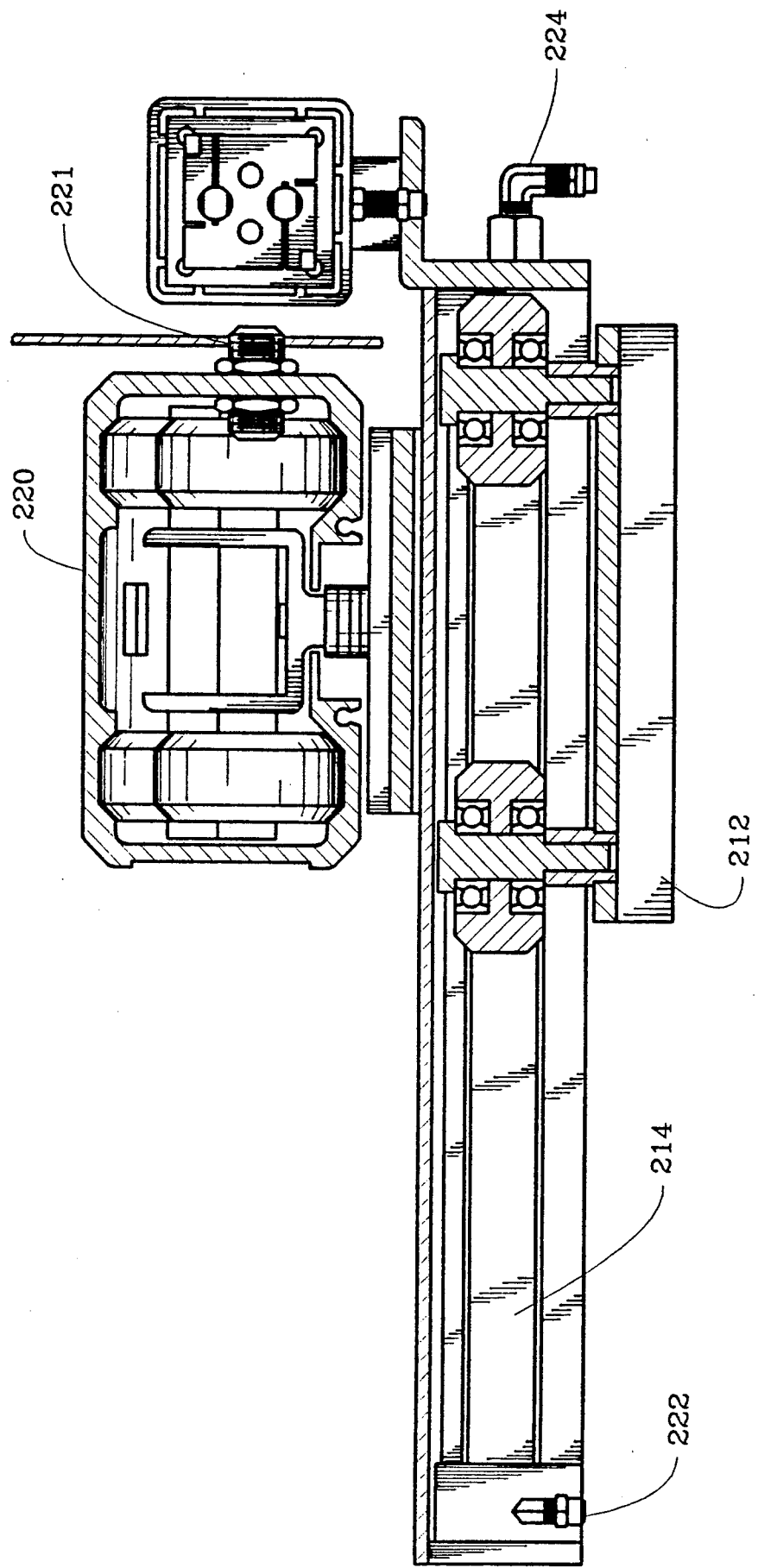
FIG. 9 is a cross sectional side view of the extension arm and end view of the guide track.

FIG. 9 provides a cross sectional end view of the guide track 220 with the 2 wire inductive sensor 221, the guide track 220 coupled to the extension assembly and operatively associated with the pneumatic cylinder 214, controlled by the previously described solenoid system of FIG. 5 with air inputs into fittings 222 and 224.

Figure 10:
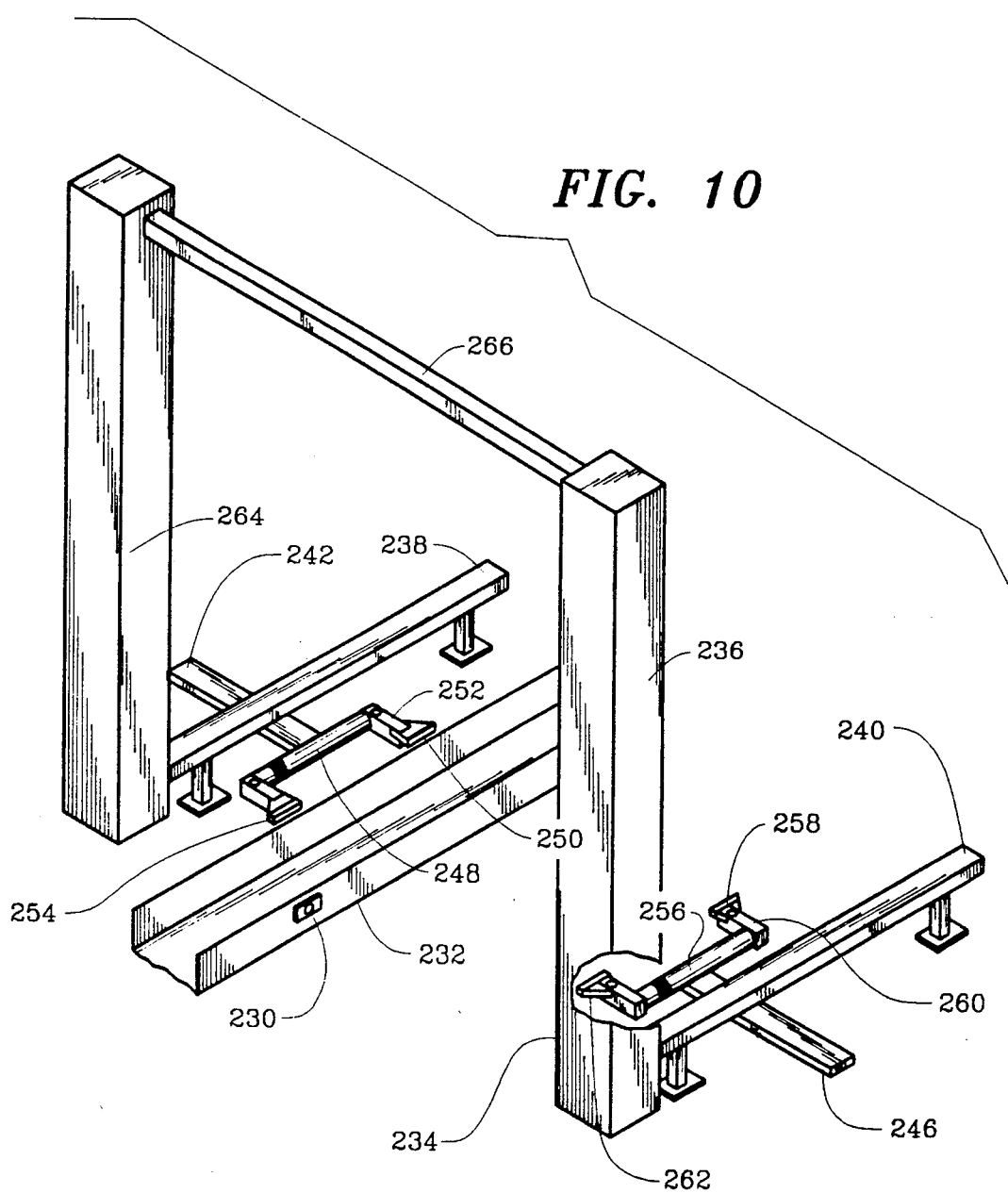
FIG. 10 is a pictorial view of the instant invention placed on the outboard stance of a vehicle path.

FIG. 10 is a pictorial view of a typical installation wherein the tire spraying system of the instant device is mounted upward of a vehicle's path of travel through a conventional carwash. In operation, a photoelectric emitter 230 is located outboard the vehicle path of travel along the side wall of track 232 wherein the photoelectric beam is transmitted to a photoelectric control receiver 234 located on the opposite side of the vehicle path along the side wall of upright 236. When an approaching car is to be treated, the photoelectric beam is broken which initiates operation of the apparatus. Operatively associated with the photo beam is a microprocessor which calculates the duration between the breaking of the beam by the forward edge of a passing tire and the time the beam is returned by the beam passing the tailing edge of the tire. The computation is from the diameter across the tire at the photo beam height, approximately 5 inches from the floor, as well as the center of the tire the instant the beam is unbroken.

A first guide track 238 is disposed in parallel relation to a second guide track 240 in parallel relation to one another and outward of the vehicle's path of travel. Each guide track has a first edge and a second edge with a carriage 242 and 246 with a longitudinal axis perpendicular to each guide track 238 and 240, respectively. Carriage 242 is propelled along the guide track by a DC stepper motor placed within upright 264. Conversely, carriage 246 is propelled along guide track 240 by a DC stepper motor housed within upright 236. Carriage 242 is a conventional pneumatic cylinder as previously described disposed within an enclosure, extendable and retractable by the injection of air at the respective ends. Carriage 242 is propelled inward taking vending bracket 248 to a predetermined position juxtapositioned to a tire sidewall by use of a vending bracket positioner located near the front vending bracket 252 attached to vending bracket 248. Vending dispenser 254 is made adjustable to the diameter of the tire as previously described by a timing mechanism used in conjunction with the photoelectric beam receiver 234 located on upright 236 and emitter 230 located on tire track 232. Accordingly, vending bracket 256 is made adjustable to a predetermined position next to a tire sidewall by a positioning means such as a convergent beam 258 mounted on vending bracket 260. Similarly, vending bracket 248 is adjusted in accordance with the positioner 252. As a tire rotates, the vending bracket 254 transverses in a parallel relation to the tire as adjusted by carriage 242, whereby vending nozzle 250 directs a high stream of air upward to strip moisture from the tire sidewall while simultaneously depositing a coating of protective chemical to the now air-stripped tire sidewall. At the same time, rear vending nozzle 254 is directing a downward high stream of air to strip moisture from the tire sidewall while simultaneously depositing a layer of protective chemical to the now moisture-removed area. In the same manner, vending nozzle 260 and 262 form a mirror image of vending nozzle 250 and 254 for treating the tire on the opposite side of the vehicle path. Carrier connector 266 provides a means for channelling interconnecting wires and air lines above and over the vehicle path for ease of accessibility and coupling the two units to a single microprocessor unit.

It is to be understood that while we have illustrated and described certain forms of my invention, it is not to be limited to the specific forms of arrangement of parts herein described and shown. It will be apparent to those skilled in the art that various changes may be made without departing from the scope of the invention and the invention is not to be considered limited to what is shown in the drawings and described in the specification.

What is claimed is:

1. A tire spraying system for treating tires mounted on a vehicle as the vehicle follows a prescribed path of travel, comprising:
    first and second elongated guide tracks, each of said guide tracks having a first end and a second end;
    first and second carriages, each having a longitudinal axis perpendicular to a respective guide track and slidably disposed thereon;
    propelling means for moving each respective carriage from said first end to said second end of each of said first and second guide tracks;
    front vending means for treating a front side wall of each tire;
    rear vending means for treating a rear side wall of each tire;
    a bracket means for rigidly attaching a front vending means and adjustably attaching a rear vending means to each of said respective first and second carriages;
    means for positioning said front and rear vending means, associated with each of said carriages, between a first and second position, respectively, wherein both said first and second positions are adjacent to a tire wall;
    means for enabling said system upon a tire reaching an associated activator means positioned relative to a front vending means; and
    whereby said propelling means on each of said carriages is modulated to match vehicle velocity along said track while said front and rear vending means maintain spatial orientation with respect to said tire, so said tires are treated while rotating on said vehicle.

2. The tire spraying system recited in claim 1 wherein said rear vending means comprise a housing having a blower nozzle disposed therein.

3. The tire spraying system recited in claim 1 wherein said front vending means comprises a the housing having a spray head connected therein.

4. The tire spraying system recited in claim 1 wherein said front vending means includes an adjustable attachment for adjusting said bracket means and a pneumatic apparatus rigidly connected to said front vending means to permit forward and reverse movement of said front vending means relative to said rear vending means.

5. The tire spraying system according to claim 1, wherein said means for enabling comprises:
    a photoelectric emitter for emitting a photoelectric beam transverse to the path of travel;
    a photoelectric receiver for detecting said photoelectric beam; and
    a microprocessor connected to said photoelectric receiver for interpreting the status of said receiver and controlling said front and rear vending means by controlling said propelling means in response to said tires breaking the beam of said photoelectric emitter.

* * * * *